United States Patent Office

2,944,940
Patented July 12, 1960

1

2,944,940

ADRENOCORTICOTROPHIN AND ZINC COMPOSITION

Joseph D. Fisher, Chicago Heights, and Robert E. Thompson and James B. Kottemann, Chicago, Ill., assignors to Armour and Company, Chicago, Ill., a corporation of Illinois No Drawing. Filed Jan. 16, 1956, Ser. No. 559,095

6 Claims. (Cl. 167—74)

This invention relates to an adrenocorticotrophic hormone product, and more particularly to an adrenocorticotrophin (ACTH) composition demonstrating an enhanced hormonal activity and a prolonged duration of physiological effect in animals and human beings.

An object of this invention is the provision of an ACTH composition, which, although in solution form, produces a prolonged duration of physiological effect. Another object is to provide an ACTH composition characterized chemically by containing ACTH in soluble form, and biologically by a substantial absence of local tissue irritation together with an enhanced ACTH activity and a prolonged duration of physiological effect. Other objects and advantages will become apparent as the specification proceeds.

In one aspect of this invention there is provided an ACTH composition, including adrenocorticotrophin and zinc in an aqueous medium, in which the adrenocorticotrophin is maintained in solution. We have discovered that an ACTH composition, including a critical concentration of zinc ion, in which the adrenocorticotrophin is maintained in soluble form demonstrates an enhanced adrenocorticotrophic hormone activity and a prolonged duration of physiological effect greater than that of the same ACTH composition in the absence of zinc ion.

We have found that chelating agents, e.g. glycine and sodium citrate, reduce the activity of an aqueous ACTH solution in a particular time response bioassay pattern. By "particular time response bioassay pattern" we mean the adrenal ascorbic acid depletion obtained in hypophysectomized rats at a particular time interval, e.g. three hours after injection of the hormonal preparation into rats. On the other hand, we have found that the combination of zinc with an aqueous ACTH solution in a concentration such that adrenocorticotrophin is maintained in soluble form results in an enhancement of the ACTH potency in a particular time response bioassay pattern. By varying the concentration of zinc in the aqueous ACTH solution it was demonstrated that a critical concentration of zinc enhanced the ACTH potency as much as 2.0 times that of a control ACTH solution without zinc, but that at zinc concentrations in excess of this critical value the ACTH potency was rapidly decreased. This critical concentration of zinc was found to be independent of the ACTH concentration in the aqueous solution. Although this enhancement of ACTH potency may be obtained at a zinc concentration of at least 0.0075% (weight/volume), especially desirable enhancement of ACTH potency in a particular time response pattern can be achieved at a zinc concentration within the range of 0.015 to 0.03% (weight/volume) in an aqueous ACTH solution.

We have further demonstrated that a zinc concentration in an aqueous ACTH solution of at least 0.015% (weight/volume) alters the time response pattern of an ACTH substance of specific potency to produce prolonged duration of physiological effect. By an "altered time response pattern," we mean that the adrenal ascorbic acid depletion determined in hypophysectomized rats at several time intervals after injection of an ACTH substance of specific potency was maintained at a significant level for a prolonged period of time. Some prolonged duration of action for the ACTH substance can be obtained at a zinc concentration of as low as 0.0075% (weight/volume) in an aqueous ACTH solution. This prolonged duration of physiological effect can be demonstrated at the critical zinc concentration independent of the ACTH concentration in an aqueous ACTH solution. The upper limit of zinc concentration in this adrenocorticotrophin composition is a practical consideration involved in the tolerance of animals and human beings to zinc and the solubility of the zinc salt in the aqueous ACTH composition.

In this ACTH composition the adrenocorticotrophin should not only be dissolved in the aqueous solution, but should not be adsorbed on any insoluble matter which may be included in such ACTH composition. By "not be adsorbed on any insoluble matter," we mean that if any insoluble matter is included in the aqueous ACTH solution the adrenocorticotrophin should not be adsorbed thereon and rendered insoluble. The concomitant enhancement and prolongation of adrenocorticotrophic hormone activity can be obtained with an adrenocorticotrophin composition including zinc in a concentration of at least 0.0075% (weight/volume). Better results are obtained when the zinc concentration in this adrenocorticotrophin composition is at least 0.015% (weight/volume), and the practical upper limit of zinc concentration therein may be about 0.05% (weight/volume).

The advantages of this invention may be obtained with any adrenocorticotrophin, i.e. any substance stimulating production of cortical steroids by the adrenal gland. However, a fairly well purified ACTH is to be preferred such as the cellulose-purified product disclosed by Irby M. Bunding in U.S. Patent No. 2,669,536. We have found that ACTH substances, regardless of their source or preparative history, display a significantly increased potentiation and prolongation of hormonal activity when included in this ACTH composition.

The source of the zinc constituent in this ACTH composition may be any water-soluble zinc salt which is not intrinsically toxic to animals or human beings. We mention, for example, such suitable zinc salts as zinc acetate, zinc chloride, zinc sulfate, etc. However, it will be understood that this source of zinc may be any zinc salt which does not result in the adsorption of ACTH on insoluble matter in the ACTH composition.

The pH of this ACTH composition may be about pH 3.5 to 5.0 to assure complete solubilization of the adrenocorticotrophin substance in the aqueous ACTH solution. However, with fairly well purified ACTH substances the pH of this ACTH composition may be from about 5.0 to 7.0 and with some highly purified ACTH substances the pH of the ACTH composition may be as high as about pH 7.5. The adjustment of pH in this ACTH composition may be obtained with such reagents as maintained the ACTH activity in the dissolved state, i.e., these reagents should not result in the precipitation of ACTH or the formation of insoluble complexes or adsorbates with the ACTH.

The ACTH potency of this ACTH-zinc composition may be further enhanced, and the duration of the physiological effect thereof prolonged to an even greater length, by the inclusion therein of gelatin or carboxymethyl cellulose (CMC), or a combination thereof.

The gelatin included in this ACTH composition should be non-antigenic and substantially non-irritating and non-toxic upon parenteral administration. Also, the gelatin should be of "pharmaceutical" quality, which means that when included in a veterinary product it should be suitable for injection into animals and when included in a product intended for human use it should be suitable for injection into humans. The only other important factors governing suitability of the gelatin for use herein are purely practical matters involved in the techniques of a parenteral administration. For example, in the administration of a drug contained in a vehicle, it is desirable that such vehicle be fluid, or at least easily liquified at room temperature, and that its gel point be such that it does not solidify in the injection needle during administration to the patient. The gel point of gelatin can be reduced by partial hydrolysis. One method of obtaining partial hydrolysis of gelatin involves heating an aqueous solution of gelatin in an autoclave for such a period of time, and under such temperature and pressure conditions, as to produce the desired degree of hydrolysis therein. The ACTH composition of this invention may include a concentration of less than about 40% of a partially hydrolyzed gelatin. On the other hand, when a substantially unhydrolyzed gelatin is included therein, a concentration of less than about 20% has been found to be suitable, and especially desirable results are obtained when the concentration of gelatin in this ACTH composition is within the range of 8 to 18%. Some benefit may be achieved with a concentration of gelatin in this ACTH composition of less than 8%. An especially desirable zinc-ACTH composition may include a special gelatin having a gel point of not more than 22° C. in a concentration of at least 25% (weight/volume). This low gel point gelatin, dissolved in an aqueous solution of adrenocorticotrophin and zinc at a concentration within the critical range has been found to enhance ACTH potency, and prolong its duration of physiological effect, to a surprisingly great extent. The advantages of this embodiment may be achieved with oxypolygelatin at a concentration within the critical range.

Although enhancement of ACTH potency and prolongation of its physiological effect can be desirably improved by the inclusion in the ACTH composition of CMC, other oxygenated polysaccharides may be suitably substituted therefor. The term "oxygenated polysaccharides" includes such compounds as polysaccharinic acids and carboxyl hydrocarbon derivatives of polysaccharides, e.g. carboxyalkyl polysaccharides. These oxygenated polysaccharides may be of vegetable, animal and bacterial origin, including both the nutrient and structural types thereof. Thus, this oxygenated polysaccharide can be an oxidized derivative of such vegetable nutrient polysaccharides as starches, e.g. amylose and amylopectin, an insulin; such vegetable structural polysaccharides as celluloses, e.g. carboxymethyl cellulose and oxycellulose, xylans, pectins and algins; such animal polysaccharides as glycogens, chitins and mucopolysaccharides, e.g. chondroitin sulfuric acid, heparin and hyaluronic acid; and such bacterial polysaccharides as levans and dextrans. The concentration of CMC included in this ACTH composition should be such as to produce a product of sufficiently low viscosity as to be syringeable, but at the same time being adequate for the purposes of this invention. The CMC should also be of pharmaceutical quality.

We have found that an organic reducing agent containing at least one sulfhydryl group, such as beta mercaptoethanol and thioglycolic acid, may be included in this ACTH concentration to improve the stability of the adrenocorticotrophin therein, although especially desirable results can be achieved with cysteine. The concentration of cysteine in this ACTH composition may be at least 0.02% (weight/volume), but better stabilization of the adrenocorticotrophin can be obtained at a cysteine concentration from 0.1 to 0.5% (weight/volume). The stabilization of ACTH by the special reducing agent in this composition may be obtained at a pH of from 4.5 to 8.0, but better results can be achieved at a pH of from 5.5 to 7.0, and especially desirable stabilization may be provided at a pH of about 6.5.

The analysis of the ACTH activity of these compositions can be obtained by the corticotrophin SCG assay procedure described in the U.S. Pharmacopeia XV, wherein the potency manifested upon subcutaneous administration may be expressed as USP units per ml.

This invention can be further illustrated by the following specific examples.

Example I

An ACTH composition in 16% aqueous gelatin was prepared. The ACTH potency of this control product was considered as 100%. To an aliquot of this ACTH composition was added glycine in the amount of 31.25 mg. per ml. The activity of this aliquot was determined as 74% of the control product.

To another aliquot of this ACTH composition was added sodium citrate in the amount of 12.5 mg. per ml. The ACTH potency of this aliquot was determined as 49% of control product.

To still another aliquot of this ACTH composition was added zinc acetate dihydrate in the amount of 1.25 mg. per ml. (0.475 mg. of zinc per ml.). The ACTH potency of this aliquot was determined as 200% of the control product.

These results demonstrate the inhibition of ACTH activity by chelating agents, such as glycine and sodium acetate, and the enhancement of ACTH potency by a critical concentration of zinc.

Example II

An aqueous solution of ACTH, containing 16% by weight of acid precursor gelatin, was prepared. An aliquot of this preparation was designated as A and maintained as a control. Another aliquot of this preparation was combined with an amount of zinc acetate dihydrate equivalent to 0.9 mg. of zinc per ml., and designated product B. Still another aliquot of this preparation was combined with zinc acetate dihydrate in an amount equivalent to 0.3 mg. of zinc per ml., and designated product C.

The ACTH potency of these products was demonstrated by determining the adrenal ascorbic acid content of hypophysectomized rats to which each of such products had been administered subcutaneously in the amount of 0.5 ml. per rat. The results were as follows:

| Product | ACTH Response and Adrenal Ascorbic Acid Content (mcg. per mg.) at Specified Time Intervals (Hours) | | | | |
| --- | --- | --- | --- | --- | --- |
| | 0 | 1.5 | 2.5 | 3.5 | 5 |
| A | 4.75 | 4.00 | 3.98 | 4.23 | 4.46 |
| B | 4.75 | 4.61 | 4.52 | 4.60 | 4.70 |
| C | 4.75 | 3.90 | 3.94 | 3.83 | 3.72 |

These results demonstrate the enhancement of ACTH activity by a critical concentration of zinc.

Example III

The enhancement of particular ACTH concentrations in aqueous gelatin at critical zinc concentrations was determined, as follows:

An aqueous solution containing 16% of partially hydrolyzed gelatin and 0.5% of phenol was prepared. To one half of this gelatin solution was added 0.12 international units of ACTH activity per cc. To a portion of this solution was added 1.0 mg. of zinc acetate dihydrate per cc., and the product designated A. To another portion of this solution was added zinc acetate dihydrate in a concentration of 4.0 mg. per cc., and the product designated C.

To the other one-half of the gelatin solution was added 0.30 international units of ACTH activity per cc.

To a portion of this solution was added 1.0 mg. of zinc acetate dihydrate per cc., and the product designated B. To another portion of this solution was added 4.0 mg. of zinc acetate dihydrate per cc., and the product designated D.

These four products were injected subcutaneously to appropriate groups of hypophysectomized rats in the amount of 0.5 cc. per rat. At selected time intervals after injection, groups of rats were sacrificed and the adrenal ascorbic acid content determined. The results were as follows:

| Product | ACTH Potency in Terms of Adrenal Ascorbic Acid Content (mg. per gm.) at Selected Time Intervals (Hours) | | | | | |
|---|---|---|---|---|---|---|
| | 1 | 2 | 3 | 5 | 7 | 16 |
| A | 3.59 | 3.53 | 3.61 | 3.74 | 4.02 | 3.67 |
| B | 2.85 | 2.29 | 2.33 | 3.15 | 3.20 | 3.09 |
| C | 4.33 | 4.21 | 4.04 | 4.24 | 4.35 | 3.74 |
| D | 3.75 | 3.53 | 3.10 | 3.33 | 2.81 | 2.93 |

These results demonstrate that a concentration of 1 mg. of zinc acetate dihydrate per cc. in an aqueous solution of gelatin produces enhancement of the ACTH activity, without causing a significant effect on the time-action curve for the product. Also, it can be seen from these results that 4.0 mg. of zinc acetate dihydrate per cc. depresses the activity of ACTH, and further a high level of ACTH activity with 4 mg. of zinc acetate dihydrate per cc. (product D) produces a slower onset of action and a longer duration of ACTH activity.

*Example IV*

The enhancement of bovine ACTH, at a critical concentration of zinc, was demonstrated, as follows:

Aqueous porcine and bovine ACTH solutions, containing 16% of partially hydrolyzed gelatin and 0.5% of phenol, were prepared. The ACTH content of these gelatin solutions was equivalent to 0.3 unit of ACTH activity per cc.

These preparations were combined with zinc acetate and carboxymethyl cellulose (CMC) in selected concentrations. The resulting products were injected subcutaneously into hypophysectomized rats in a concentration of 0.5 cc. per rat. Appropriate groups of rats were sacrificed at selected time intervals and the adrenal ascorbic acid content determined. The results were as follows:

| Product | ACTH Source | Equivalent Concentration of Zinc (mg. per cc.) | CMC, Percent | ACTH Potency in Terms of Adrenal Ascorbic Acid Content (mg. per gm.) At Selected Time Intervals (Hours). | | | |
|---|---|---|---|---|---|---|---|
| | | | | 3 | 5 | 7 | 16 |
| A | Bovine | 0 | 0 | 3.68 | 3.95 | 4.22 | 4.49 |
| B | do | 0.4 | 0.5 | 2.58 | 3.02 | 3.11 | 3.78 |
| C | Porcine | 0.4 | 0.5 | 2.44 | 3.22 | 3.47 | 3.63 |
| D | do | 0 | 0 | 3.54 | 3.90 | 3.89 | 4.37 |
| E | Bovine | 0.4 | 0 | 2.62 | 3.44 | 3.19 | 3.82 |

These results demonstrate that the inclusion of zinc in a bovine ACTH gelatin combination (product E) enhances the ACTH activity over that obtained in the absence of zinc (product A). This enhancement was comparable to that obtained with porcine ACTH. These results demonstrate also that CMC has but a slight influence on the action curve of ACTH, but that the products containing both zinc and CMC were equally enhanced with ACTH porcine and bovine sources (compare products A and D with D and C).

*Example V*

The enhancement of ACTH in a neutralized gelatin vehicle containing zinc in soluble form was demonstrated, as follows:

An aqueous ACTH solution was prepared, containing ACTH in an amount equivalent to 20 USP units per cc.

An aqueous solution of gelatin having a pH of 6.4 and containing 0.166 mg. of zinc per cc. was prepared. The aforementioned ACTH solution was diluted 1:50 with this zinc solution, and the product was designated A.

An aqueous gelatin solution having a pH of 4.8 was prepared without zinc. The aforementioned ACTH solution was diluted 1:50 with this solution, and the product designated B.

The adrenal ascorbic acid content of these products was determined in hypophysectomized rats. The results were as follows:

| Product | ACTH Potency in Terms of Adrenal Ascorbic Acid Content (mg. per gm.) at Selected Time Intervals (Hr.) | | | |
|---|---|---|---|---|
| | 3 | 5 | 7 | 16 |
| A | 2.44 | 2.43 | 2.78 | 3.52 |
| B | 2.77 | 3.26 | 3.48 | 4.04 |

The neutralized zinc-ACTH gelatin solution produced a significantly greater response than that of a pH 4.8, zinc-free preparation.

*Example VI*

ACTH compositions containing particular concentrations of gelatin, CMC and zinc were prepared. These products were analyzed in hypophysectomized rats in a critical concentration of ACTH, i.e. 40 USP units per cc. The products were administered subcutaneously at a concentration of 0.1 cc. per rat.

The results were as follows:

| Product | Gelatin Concentration (percent) | CMC Concentration (percent) | Zinc Concentration (mg. per cc.) | ACTH Potency in Terms of Adrenal Ascorbic Acid (mg. per gm.) at Selected Time Intervals (Hours) | |
|---|---|---|---|---|---|
| | | | | 3 | 7 |
| A | 16 | 0 | 0 | 2.30 | 3.17 |
| B | 16 | 0 | .4 | 1.90 | 2.01 |
| C | 11 | 1.0 | 0 | 2.24 | 2.55 |
| D | 11 | 1.0 | .4 | 1.72 | 1.62 |

These results demonstrate the enhancement of ACTH potency at a critical zinc concentration. However, these products caused only a slight effect on the time-response pattern.

Clinical results with these products have demonstrated that product D is about 2 to 3 times as efficient as product A.

*Example VII*

ACTH having a potency of 40 USP units per mg., in the amount of 20 mg. was dissolved in 10 ml. of 0.12% acetic acid solution containing 2.7 mg. of USP zinc acetate dihydrate per cc. To the resulting solution was added 10 ml. of partially hydrolyzed 32% gelatin containing 1% of phenol. The resulting mixture was stirred to obtain a clear solution at a pH of 4.5. This solution was filled into pharmaceutical vials and sealed. The sealed vials were sterilized by autoclaving for 15 minutes at a pressure of 15 p.s.i.

This sterile ACTH product had the following composition:

ACTH _____ USP units per ml__ 40
Zinc acetate _____ mg. per ml__ 1.35
Partially hydrolyzed gelatin _____ percent__ 16
Phenol _____ do ____ 0.5
pH _____ 4.5

Example VIII

An aqueous solution, containing 32% of gelatin and 1.0% of phenol, was prepared. The pH of this solution was adjusted to pH 7.0 with a 10% solution of sodium hydroxide. To 100 ml. of this solution was added 50 ml. of water containing 200 mg. of zinc acetate dihydrate. The resulting mixture was autoclaved at a pressure of 15 p.s.i. for a period of one hour. After cooling to a temperature of about 60–70° C., the autoclaved mixture was clarified by filtration through a No. 7 Ertel filter pad. The clarified gelatin solution had a pH of 6.4, and contained zinc in a concentration of 166 mcg. per ml.

An aqueous solution of ACTH, containing 160 USP units of ACTH per cc., was mixed with 3 parts of this aqueous gelatin solution. The resulting solution contained ACTH in an amount equivalent to 40 Armour units per cc.

Example IX

The product described in Example VIII was prepared in a volume of 30 cc. To this product was added 0.75 ml. of a 10% solution of beta mercaptoethanol as a stabilizer.

Example X

ACTH, having a potency of 60 USP units per mg., in the amount of 94.5 mg., was dissolved in 90 ml. of distilled water containing 0.03% of acetic acid and 3.9 mg. of zinc acetate dihydrate per cc. This solution was mixed with 90 ml. of an aqueous solution containing 3% of low viscosity, type 70, premium grade CMC and 0.5% phenol.

The resulting mixture was combined with 90 ml. of an aqueous solution containing 32% of partially hydrolyzed acid-precursor gelatin and 1.0% of phenol.

The resulting product was filled into pharamaceutical vials and sterilized by autoclaving. The pH of the vialed product was pH 5.9.

Example XI

An aqueous solution, containing 8,000 units of ACTH in 20 ml., was mixed with 100 ml. of water. To this solution was added 483 mg. of zinc acetate dihydrate, 900 mg. of cysteine base.

The resulting solution was mixed with 60 ml. of an aqueous solution containing 3% of low viscosity, type 70 CMC and 0.5% of phenol. The resulting mixture was combined with 180 ml. of an aqueous solution containing 32% of partially hydrolyzed gelatin and 1% of phenol.

This product was filled into pharmaceutical vials, and, after sealing, was sterilized by autoclaving for a period of 15 minutes at a pressure of 15 p.s.i.g. The vialed product had a pH of 4.7.

Example XII

An ACTH composition was prepared according to the method of Example XI except that USP alkaline-precursor gelatin having a pH of 6.0 was substituted for the acid-precursor gelatin employed in such example. The pH of the resulting ACTH product was pH 5.35.

Example XIII

An aqueous solution, containing 32% of gelatin and 1% of phenol, was mixed with sufficient trisodium phosphate to produce a pH of 7.0 therein. To 100 ml. of this gelatin solution was added 50 ml. of water containing 150 mg. of zinc acetate dihydrate. The resulting mixture was autoclaved at a pressure of 15 p.s.i.g. for a period of one hour.

The autoclaved preparation was cooled to a temperature of about 70° C. and clarified by filtration through a No. 7 Ertel filter pad. To the clarified solution was added 50 ml. of an aqueous solution containing 160 USP units of ACTH per ml. The resulting solution was filled into pharmaceutical vials and sterilized by autoclaving. This vialed product had a pH of 6.8, and contained zinc in a concentration of 36.3 mcg. per ml.

Example XIV

An ACTH composition was prepared according to the method of Example XIII, except that 0.3% of beta mercaptoethanol was added as a stabilizer.

Example XV

An ACTH composition was prepared according to the method of Example VII, except that the vialed product contained 0.5 mg. of zinc acetate dihydrate per ml. (0.15 of zinc per ml.) at a pH of 4.7.

Example XVI

An aqueous solution of ACTH, containing 16% of gelatin and 0.5% of phenol, was prepared. This ACTH-gelatin solution was divided into 5 portions. To each of 4 of these portions was added zinc acetate dihydrate in selected concentrations (weight/volume). The fifth portion was maintained as a control.

These 5 zinc-ACTH-gelatin preparations were injected subcutaneously into appropriate assay groups of hypophysectomized rats. These rats were sacrificed after a particular time interval, and the ACTH potency determined by the ascorbic acid content of the adrenals thereof.

The assay results are expressed in the following table in terms of the ratio of the ACTH potency, of each preparation to that of the control.

| Concentration of Zinc Acetate Dihydrate (Percent) | ACTH Potency as a Ratio of the Control (Percent) |
|---|---|
| 0.01 | 80 |
| 0.05 | 130 |
| 0.1 | 230 |
| 1.0 | 100 |

Example XVII

The process of Example XVI was employed in determining the effect of varying concentrations of zinc in enhancing the potency of a different ACTH product.

The results, in terms of the ratio of ACTH potency of the zinc-containing preparations to that of the control, were as follows:

| Concentration of Zinc Acetate Dihydrate (Percent) | ACTH Potency as a Ratio of the Control (Percent) |
|---|---|
| 0.022 | 168 |
| 0.05 | 250 |
| 0.1 | 230 |
| 0.25 | 110 |
| 0.5 | 60 |

The ratio of the molecular weight of zinc to that of zinc acetate dihydrate, in terms of percentage, is 30%, and consequently it can be seen from Examples XVI and XVII that optimal enhancement of ACTH potency is obtained at a zinc concentration of from 0.015 to 0.03% (weight/volume), and that some enhancement of the ACTH potency is achieved at a zinc concentration as low as 0.0075% (weight/volume).

Example XVIII

To the ACTH product obtained according to the method of Example VIII was added cysteine in amount such as to produce therein a concentration of 0.25% (weight/volume).

Example XIX

ACTH, in the amount of 20 mg. was dissolved in 7 cc. of a 0.12% acetic acid solution containing 3.8 mg. of zinc acetate dihydrate per cc. To the resulting solution was added 7 cc. of a 0.12% acetic acid solution containing 1.5% of phenol and 3.9% of glycerine. This solution was diluted with 7 cc. of a 0.12% acetic acid solution to a total volume of 21 cc.

This dilute solution was filled into glass vials, 2.5 cc. per vial, and the filled vials were stoppered and sealed. The vialed product was autoclaved at a pressure of 15 p.s.i.g. for a period of 15 minutes for sterilization. This product was designated A.

A control preparation (B) was prepared by dissolving the same ACTH at a similar concentration, in an aqueous solution containing 16% of partially hydrolyzed gelatin and 0.5% of phenol.

A secondary control preparation (C) was produced as in product B except that zinc acetate was added in a concentration equal to that of product A.

These preparations were each injected into a randomly selected group of 4 hypophysectomized rats by subcutaneous administration, in the amount of 0.1 cc. per rat. Appropriate groups of the rats were sacrificed at selected time intervals after injection. The depletion of adrenal ascorbic acid in the sacrificed rats was determined, and the results are expressed in the following table in terms of mcg. per mg. of adrenal weight:

| Product | Time Interval (Hrs.) | |
|---|---|---|
| | 3 | 7 |
| A | 2.06 | 2.46 |
| B | 2.30 | 3.17 |
| C | 1.90 | 2.01 |

These results indicate that an aqueous solution of ACTH, containing zinc, produces a stronger physiological response than the same preparation in the absence of zinc. Further, the aqueous solution of ACTH, containing both gelatin and zinc, produces an even greater physiological response.

*Example XX*

Products A and B, obtained by the process of Example XIX, were compared, by the same assay procedure, with an aqueous solution, containing the same ACTH in combination with phenol and glycerine, but in the absence of zinc and gelatin. This latter preparation is designated in the following table as product D:

| Product | Time Interval | |
|---|---|---|
| | 3 | 7 |
| A | 2.01 | 2.51 |
| B | 2.38 | 3.28 |
| D | 2.59 | 3.06 |

These results indicate that an aqueous solution of ACTH, containing zinc, produces a physiological response greater than that of an aqueous solution of ACTH, containing gelatin, and an even greater response than an aqueous solution of ACTH.

The ACTH employed in the composition of Examples XIX and XX were purified by adsorption and elution on oxycellulose, and had a potency, by intravenous administration of 15±1.6 USP units per mg. and by subcutaneous administration, of 50.8±0.8 USP units per mg.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:

1. An adrenocorticotrophin composition suitable for parenteral administration, comprising zinc and adrenocorticotrophin in an aqueous solution, said zinc being in a concentration of from 0.0075 to 0.03% (weight/volume) in said adrenocorticotrophin composition, said adrenocorticotrophin being maintained in the dissolved state in said aqueous solution, and said adrenocorticotrophin composition demonstrating an enhanced adrenocorticotrophic hormone activity and a prolonged duration of physiological effect greater than that of said adrenocorticotrophin composition in the absence of zinc.

2. An adrenocorticotrophin composition suitable for parenteral administration, comprising zinc and adrenocorticotrophin in an aqueous medium, said zinc being in a concentration of from 0.015 to 0.03% (weight/volume) in said adrenocorticotrophin composition, said adrenocorticotrophin being maintained in the dissolved state in said aqueous medium.

3. An adrenocorticotrophin composition suitable for parenteral administration, comprising zinc and adrenocorticotrophin in combination with an organic reducing agent containing at least one sulfhydryl group in an aqueous medium, said adrenocorticotrophin composition being at a pH within the range of pH 4.5 to 8.0 and said zinc being dissolved in said aqueous medium at a concentration of from 0.0075 to 0.03% (weight/volume).

4. The adrenocorticotrophin composition in claim 3 in which said organic reducing agent is cysteine.

5. An adrenocorticotrophin composition suitable for parenteral administration, comprising an aqueous gelatin solution containing adrenocorticotrophin and a water-soluble zinc salt at a concentration such as to provide from 0.015 to 0.03% (weight/volume) of zinc in said solution, said adrenocorticotrophin being maintained in the dissolved state in said solution.

6. An adrenocorticotrophin composition suitable for parenteral administration, comprising a water-soluble zinc salt, cysteine and adrenocorticotrophin in an aqueous gelatin solution, said aqueous gelatin solution having a pH of from 5.5 to 7.5, said zinc salt being at a concentration such as to provide in said solution zinc being soluble to the extent of from 0.015 to 0.03% (weight/volume), and said cysteine being at a concentration within the range of from 0.1 and 0.5% (weight/volume) in said solution.

References Cited in the file of this patent

UNITED STATES PATENTS 2,807,569    Homan _____ Sept. 24, 1957

OTHER REFERENCES

Homan: The Lancet, vol. 266, No. 6811, Mar. 13, 1954, pp. 541, 542.

Carr: Science, vol. 116, Nov. 21, 1952, pp. 566–568.

White: Proc. Soc. Exp. Biol. and Med., vol. 78, No. 2, November 1951, p. 616.